US009645995B2

United States Patent
Gallé et al.

(10) Patent No.: US 9,645,995 B2
(45) Date of Patent: May 9, 2017

(54) LANGUAGE IDENTIFICATION ON SOCIAL MEDIA

(71) Applicant: Xerox Corporation, Norwalk, CT (US)

(72) Inventors: Matthias Gallé, Saint Martin d'Hères (FR); William Radford, Grenoble (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 105 days.

(21) Appl. No.: 14/666,767

(22) Filed: Mar. 24, 2015

(65) Prior Publication Data

US 2016/0283462 A1 Sep. 29, 2016

(51) Int. Cl.
*G10L 15/18* (2013.01)
*G06F 17/27* (2006.01)
*G06Q 50/00* (2012.01)

(52) U.S. Cl.
CPC .......... *G06F 17/275* (2013.01); *G06Q 50/01* (2013.01)

(58) Field of Classification Search
CPC ...... G06Q 50/01; G06Q 30/02; G06Q 10/101; G06Q 30/0269; G06Q 30/0255; G06F 17/275; G06F 17/274; G06F 17/2745; G06F 17/27; G06F 17/2705; G06F 17/277; G06F 17/30867; G06F 17/30958; G06F 17/30528; G06F 17/30864; G06F 17/30392; G06F 17/30554; G06F 17/30312
USPC ...... 704/1–10, 257; 707/748, 728, 706, 723, 707/734
See application file for complete search history.

(56) References Cited

U.S. PATENT DOCUMENTS

| 5,062,143 | A | 10/1991 | Schmitt |
| 6,167,369 | A | 12/2000 | Schulze |
| 8,738,363 | B2 | 5/2014 | Brun et al. |
| 2004/0158454 | A1 | 8/2004 | Polanyi et al. |
| 2009/0265304 | A1 | 10/2009 | Ait-Mokhtar et al. |
| 2012/0035914 | A1 | 2/2012 | Brun |
| 2012/0124060 | A1* | 5/2012 | Muskal ............ G06F 17/30958 707/748 |
| 2012/0245923 | A1 | 9/2012 | Brun |

(Continued)

OTHER PUBLICATIONS

U.S. Appl. No. 14/064,327, filed Oct. 28, 2013, Brun, et al.

(Continued)

*Primary Examiner* — Marivelisse Santiago Cordero
*Assistant Examiner* — Stephen Brinich
(74) *Attorney, Agent, or Firm* — Fay Sharpe LLP

(57) ABSTRACT

A method for language prediction of a social network post includes generating a social network graph which includes nodes connected by edges. Some of the nodes are user nodes representing users of a social network and some of the nodes are social network post nodes representing social network posts. At least some of the users are authors of social network posts represented by respective social network post nodes. Edges of the graph are associated with respective weights. At least one of the social network post nodes is unlabeled. Language labels are predicted for the at least one unlabeled social network post node which includes propagating language labels through the graph. A language of the social network post is predicted based on the predicted language labels for the social network post node representing that social network post and optionally also based on content-based features.

21 Claims, 3 Drawing Sheets

(56) References Cited

U.S. PATENT DOCUMENTS

| | | | |
|---|---|---|---|
| 2013/0073387 A1* | 3/2013 | Heath | G06Q 50/01 |
| | | | 705/14.53 |
| 2013/0096909 A1 | 4/2013 | Brun et al. | |
| 2013/0218914 A1 | 8/2013 | Stavrianou et al. | |
| 2013/0275429 A1* | 10/2013 | York | G06F 17/30029 |
| | | | 707/737 |
| 2014/0067370 A1 | 3/2014 | Brun | |
| 2014/0163951 A1 | 6/2014 | Nikoulina et al. | |
| 2014/0365207 A1 | 12/2014 | Convertino et al. | |
| 2015/0178745 A1* | 6/2015 | Soria | G06Q 50/22 |
| | | | 705/2 |
| 2015/0213085 A1* | 7/2015 | Brooks | H04L 67/306 |
| | | | 707/758 |

OTHER PUBLICATIONS

Baluja, Shumeet, et al, "Video Suggestion and Discovery for Youtube: Taking Random Walks Through the View Graph," *Proc. 17th Int'l Conf. on World Wide Web* in WWW '08, pp. 895-904 (2008).

Bergsma, Shane, et al., "Language identification for creating language-specific twitter collections," *Proc. 2nd Workshop on Language in Social Media, LSM '12*, pp. 65-74, Stroudsburg, PA, ACL (2012).

Brun, "Detecting Opinions Using Deep Syntactic Analysis," *Proc. Recent Advances in Natural Language Processing (RANLP)*, Hissar, Bulgaria, pp. 392-398 (2011).

Bush, Brian O. "Language Identification of Tweets Using LZW Compression," *Pacific Northwest Regional NLP Workshop*, pp. 1-3 (2014).

Carter, Simon et al., "Microblog language identification: Overcoming the limitations of short, unedited and idiomatic text," *Lang. Resour. Eval.*, vol. 47, No. 1, pp. 195-215 (2013).

Chen, Jinxiu et al, "Semi-supervised Relation Extraction with Label Propagation," *Proc. Human Lang. Technol. Conf of the NAACL, Companion Volume: Short Papers*, pp. 25-28 (2006).

Garrette, Dan, et al., "Learning a Part-of-Speech Tagger from Two Hours of Annotation," *Proc. 2013 Conf. of the North American Chapter of the Association for Computational Linguistics: Human Language Technologies*, pp. 138-147 (2013).

Goldszmidt, Moises, et al., "Boot-strapping language identifiers for short colloquial postings," *Proc. European Conf. on Machine Learning and Principles and Practice of Knowledge Discovery in Databases (ECMLPKDD 2013)*, pp. 1-16 (2013).

Gottron, Thomas, et al., "A comparison of language identification approaches on short, query-style texts," *Adv. in Information Retrieval*, pp. 611-614 (2010).

Graham, Mark, et al., "Where in the world are you? Geolocation and language identification in twitter," *The Professional Geographer*, pp. 1-8 (2014).

Grefenstette, Gregory, "Comparing two language identification schemes," *Technical report, Xerox Research Centre Europe*, pp. 1-6 (1995).

Lui, Marco, et al., "Accurate Language Identification of Twitter Messages," *Proc. 5th Workshop on Language Analysis for Social Media (LASM), EACL*, pp. 17-25 (2014).

Lui, Marco, et al., "langid.py: An off-the-shelf language identification tool," *Proc. ACL 2012 System Demonstrations*, pp. 25-30 (2012).

Speriosu, Michael, et al., "Twitter Polarity Classification with Label Propagation over Lexical Links and the Follower Graph," *Proc. 1st Workshop on Unsupervised Learning in NLP*, pp. 53-63 (2011).

Subramanya, Amarnag et al., "Efficient Graph-Based Semi-Supervised Learning of Structured Tagging Models," *Proc. 2010 Conf. on Empirical Methods in Natural Language Processing*, pp. 167-176 (2010).

Talukdar, Partha Pratim et al., "New Regularized Algorithms for Transductive Learning," *Proc. European Conf. on Machine Learning and Knowledge Discovery in Databases: Part II* in ECML PKDD '09, pp. 442-457 (2009).

Talukdar, Partha Pratim et al., "Experiments in Graph-Based Semi-Supervised Learning Methods for Class-Instance Acquisition," *Proc. 48th Annual Meeting of the Assoc. for Computational Linguistics*, pp. 1473-1481 (2010).

Tromp, Erik, et al., "Graph-based n-gram language identification on short texts," *Proc. 20th Machine Learning conference of Belgium and The Netherlands*, pp. 27-34 (2011).

Vogel, John, et al., "Robust language identification in short, noisy texts: Improvements to liga," *3rd Int'l Workshop on Mining Ubiquitous and Social Environments*, pp. 43-50 (2012).

Zhu, et al., "Learning from labeled and unlabeled data with label propagation," *Technical report, CMU-CALD-02-107*, Carnegie Mellon University, pp. 1-17 (2002).

Chanod, et al., "Tagging French text: tagset, dedicated lexicons and guesser," Proc. From Texts to Tags: Issues in Multilingual Language Analysis, EACL SIGDAT workshop, Dublin, pp. 1-8 (1995).

McNamee, Paul, "Language identification: A solved problem suitable for undergraduate instruction," J. Comput. Sci. Coll., vol. 20, No. 3, pp. 94-101 (2005).

Moghaddam, et al., "Opinion Digger: An Unsupervised Opinion miner from Unstructured Product Reviews," Proc. 19th Conf. on Information and Knowledge Management (CIKM'10), pp. 1825-1828 (2010).

\* cited by examiner

LANGUAGE IDENTIFICATION ON SOCIAL MEDIA

BACKGROUND

The exemplary embodiment relates to a system and method for language identification and finds particular application in the context of social media.

The textual content of social media posts can provide a wealth of information which can assist companies in understanding the views of customers about their products and services, allowing them to make improvements in products and services as well as providing improved customer care. Opinion mining techniques have been used to assign an opinion or emotion to a particular textual comment. Since there is generally no restriction on the language which can be used, the first stage in analyzing such documents is to identify the language of the document.

Methods for identifying the language of a written document are used in a number of applications, including translation, information retrieval, and the like. The accuracy of existing methods is generally quite high, and can be close to 100% in some cases. See Paul McNamee, "Language identification: A solved problem suitable for undergraduate instruction," J. Comput. Sci. Coll., 20(3):94-101 (2005); and Thomas Gottron, et al., "A comparison of language identification approaches on short, query-style texts," Adv. in Information Retrieval, pp. 611-614 (2010). However, in some contexts, such as for social media documents, the accuracy can be much lower. Social media texts are often written in a much less organized and less formal way than are traditional structured and edited documents. They often contain slang, abbreviations, code-switching (alternating between two or more languages, or language varieties, in the context of a single conversation) and can be extremely short. Language prediction accuracies of up to only about 70-80% are more typical for such texts, even when the list of possible languages is limited.

Traditional language identification methods often include comparing a document with a fingerprint of each language using, for example, a bag-of-n-grams (at the character or word level) or function words. Language identification on Twitter has been attempted using a baseline of character or word n-grams, which has been enhanced with additional sequential information by connecting character 3-grams in a graph (one graph per language) and finding a path of the tweet on this graph, as described in Erik Tromp, et al. "Graph-based n-gram language identification on short texts," Proc. 20th Machine Learning Conf. of Belgium and The Netherlands, pp. 27-34 (2011). Some improvements can be achieved through a better pre-processing, as described in John Vogel, et al., "Robust language identification in short, noisy texts: Improvements to LIGA," 3rd Intl Workshop on Mining Ubiquitous and Social Environments, p. 43 (2012).

Social media content is generally associated with metadata. For example, Twitter allows users to identify the geo-location in which they are based, which can be included as an additional signal. See, Moises Goldszmidt, et al., "Boot-strapping language identifiers for short colloquial postings," Proc. European Conf. on Machine Learning and Principles and Practice of Knowledge Discovery in Databases (2013). However, others have found that self-reported geo-locations are a bad predictor, as well as being used by only a low proportion of overall Twitter users. See Mark Graham, et al., "Where in the world are you? Geolocation and language identification in Twitter," The Professional Geographer (2014); Gregory Grefenstette, "Comparing two language identification schemes," $3^{rd}$ Intl Conf. on Statistical Analysis of Textual Data (JADT 1995), pp. 263-268 (1995), hereinafter, "Grefenstette 1995"; and Simon Carter, et al., "Microblog language identification: Overcoming the limitations of short, unedited and idiomatic text," Lang. Resour. Eval., 47(1):195-215 (March 2013), hereinafter, "Carter 2013."

Other features that have been considered for improving language identification in social media posts include the user name, as well as its prefixes, binary features regarding the script and a special tokenizer for URL's to extract the hostname and top level domain name, previously guessed languages of an author (the author's language histogram), the language histogram of users mentioned in the post, and the context of the discussion (reply-to's are stored as metadata), maximal repeats on a character level, and the like. Weighting mechanisms have also been proposed to combine two or more existing tools. See Carter 2013; Shane Bergsma, et al., "Language identification for creating language-specific Twitter collections," Proc. 2nd Workshop on Language in Social Media, LSM '12, pp. 65-74 (2012), hereinafter, "Bergsma 2012"; Shumeet Baluja, et al., "Video Suggestion and Discovery for Youtube: Taking Random Walks Through the View Graph," Proc. 17th Intl Conf. on World Wide Web (WWW '08), pp. 895-904 (2008), hereinafter, "Baluja 2008." However, the research suggests that language and country metadata fields that come with the microblog posts tend to make poor signals for language identification, with the language field greatly over- or underestimating the true underlying language distribution and that the geo-location field is generally too sparsely used to be relied upon for language identification.

There remains a need for a system and method for improving the accuracy of language identification for social media text.

INCORPORATION BY REFERENCE

The following references, the disclosures of which are incorporated by reference in their entireties, are mentioned:

Language guessers and language identification methods are described in U.S. Pat. No. 5,062,143, issued Oct. 29, 1991, entitled TRIGRAM-BASED METHOD OF LANGUAGE IDENTIFICATION, by John C. Schmitt; U.S. Pat. No. 6,167,369, issued Dec. 26 2000, entitled AUTOMATIC LANGUAGE IDENTIFICATION USING BOTH N-GRAM AND WORD INFORMATION, by Bruno M Schulze; U.S. Pub. No. 20120035914, published Feb. 9, 2012, entitled SYSTEM AND METHOD FOR HANDLING MULTIPLE LANGUAGES IN TEXT, by Caroline Brun; Grefenstette 1995; and Jean-Pierre Chanod et al., "Tagging French text: tagset, dedicated lexicons and guesser," Proc. From Texts To Tags: Issues In Multilingual Language Analysis, EACL SIGDAT workshop, Dublin (1995).

Opinion mining and opinion detection systems are disclosed, for example, in U.S. Pub. No. 20120245923, published Sep. 27, 2012, entitled CORPUS-BASED SYSTEM AND METHOD FOR ACQUIRING POLAR ADJECTIVES, by Caroline Brun; U.S. Pub. No. 20130096909, published Apr. 18, 2013, entitled SYSTEM AND METHOD FOR SUGGESTION MINING, by Caroline Brun et al.; U.S. Pub. No. 20130218914, published Aug. 22, 2013, entitled SYSTEM AND METHOD FOR PROVIDING RECOMMENDATIONS BASED ON INFORMATION EXTRACTED FROM REVIEWERS' COMMENTS, by Anna Stavrianou, et al; U.S. Pub. No. 20140067370, published Mar. 6, 2014, entitled LEARNING OPINION-RE- LATED PATTERNS FOR CONTEXTUAL AND DOMAIN-DEPENDENT OPINION DETECTION, by Caroline Brun; U.S. Pub. No. 20090265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS by Ait-Mokhtar, et al., and U.S. Pub. No. 20040158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al.; Caroline Brun, "Detecting Opinions Using Deep Syntactic Analysis," Proc. Recent Advances in Natural Language Processing (RANLP), Hissar, Bulgaria (2011); Moghaddam, et al., "Opinion Digger: An Unsupervised Opinion miner from Unstructured Product Reviews," in Proc. 19th Conf. on Information and Knowledge Management (CIKM'10), 2010.

BRIEF DESCRIPTION

In accordance with one aspect of the exemplary embodiment, a method for language prediction of a social network post includes generating a social network graph which includes nodes connected by edges. Some of the nodes of the graph are user nodes representing users of a social network. Some of the users are authors of social network posts. Others of the nodes are social network post nodes representing social network posts of the authors. At least one of the social network post nodes is unlabeled. The edges of the graph are associated with respective weights. Language labels are predicted for at least one of the unlabeled social network post nodes. This includes propagating language labels through the graph to unlabeled nodes using label propagation as a function of the respective edge weights. A language of the social network post is predicted based on the predicted language labels generated for the social network post node representing that social network post.

At least one of the generating of the social network graph, propagating language labels, and predicting the language of the social network post may be performed with a processor.

In accordance with another aspect of the exemplary embodiment, a system for language prediction of a social network post includes a graph generation component which generates a social network graph. The graph includes nodes connected by edges. Some of the nodes are user nodes representing users of a social network. Some of the users are authors of social network posts. Others of the nodes are social network post nodes representing social network posts of the authors. At least one of the social network post nodes is unlabeled. The edges of the graph are associated with respective weights. A graph prediction component predicts language labels for the at least one unlabeled social network post node by propagating language labels through the graph as a function of the edge weights. A background feature extraction component extracts features based on text content of the unlabeled social network post. A background prediction component predicts language labels for the social network post based on the extracted features. An aggregating component for predicting a language of the social network post as a function of the language labels predicted for the social network post node representing that social network post by the graph prediction component and background prediction component. A processor implements the graph generation component, graph prediction component, background feature extraction component, background prediction component, and aggregating component.

In accordance with another aspect of the exemplary embodiment, a method for language prediction of a social network post includes generating a social network graph including nodes connected by edges, some of the nodes being user nodes representing users of a social network, at least some of the users being authors of social network posts, and some of the nodes being social network post nodes representing social network posts of the authors, edges of the graph being associated with respective weights, at least one of the social network post nodes being unlabeled. Features are extracted based on text content of the unlabeled social network post. One or more language labels from a set of language labels is predicted for the unlabeled social network post, based on the extracted features. One or more language labels from the set of language labels is predicted for the unlabeled social network post node by propagating language labels through the graph as a function of the edge weights. The predicted language labels are aggregated and a language for the unlabeled social media post is output, based on the aggregation.

At least one of the generating a social network graph, extracting features, predicting first and second language labels, aggregating, and outputting is performed with a processor.

DETAILED DESCRIPTION

Aspects of the exemplary embodiment relate to a system and method for language identification. In the exemplary system and method, the shortcomings of the informal language associated with social media posts is overcome, at least in part, by using other sources of information associated with social media posts.

In exemplary embodiments disclosed herein, the language of a social network post, such as a tweet, is predicted based on its textual content and also based on the languages of the tweets "read" by the author in the past. Since it is not known which tweets the author has actually read, the tweets the author receives in his news feed are used as a proxy for the tweets read. Registered users of a social network, such as Twitter, may subscribe to other registered users' tweets and thus become known as "followers" of the other users and the tweets of those other users then appear in the user's newsfeed. In turn, a user can post or repost (retweet) a tweet to his or her own followers. Two users who follow and/or are followed by the other are referred to herein as being in a "follows" relationship. An "author" of a tweet is a registered user who posts a tweet (including retweets).

Figure 1:
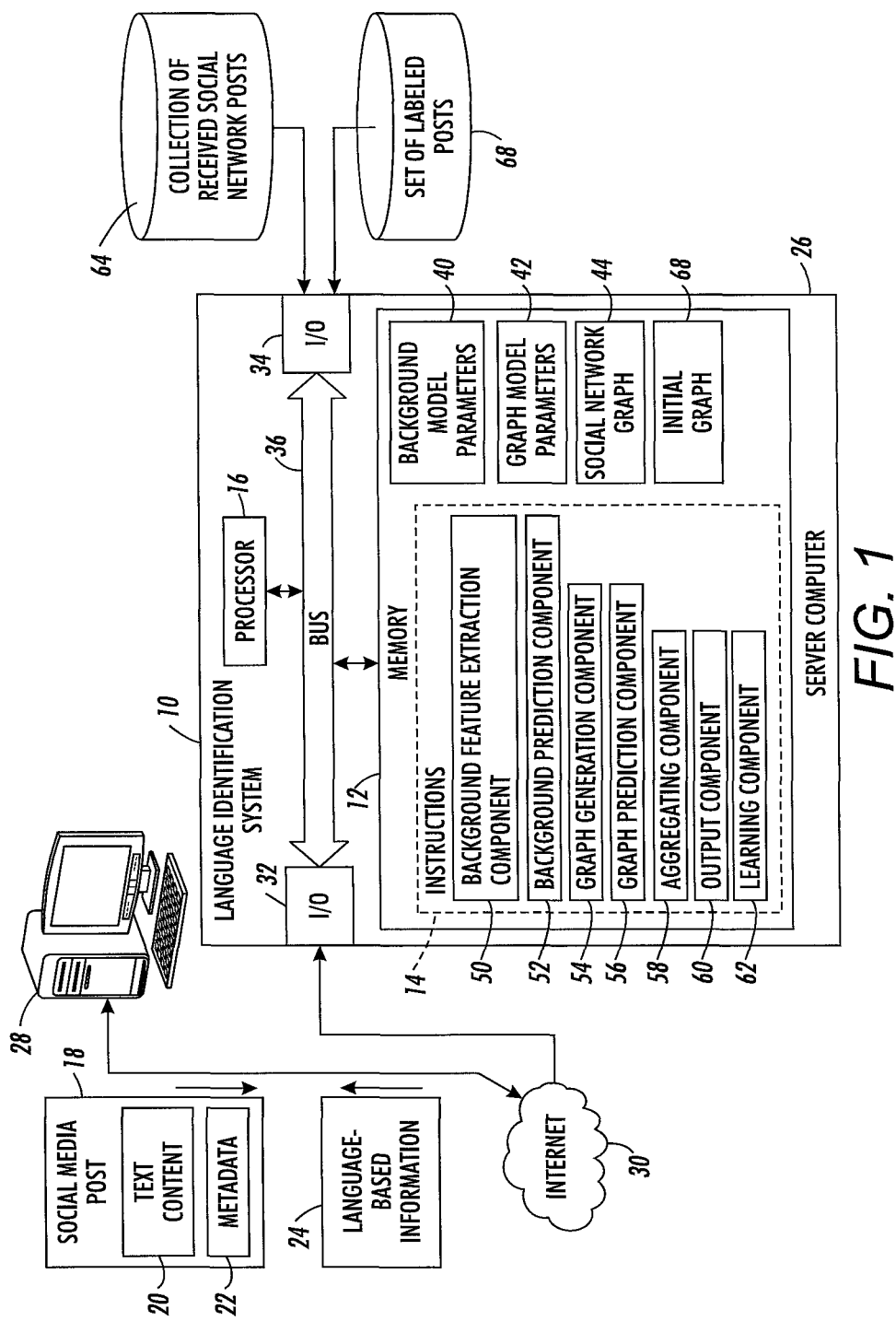
FIG. 1 is a functional block diagram of a system for language identification in accordance with one aspect of the exemplary embodiment.

With reference to FIG. 1, a language identification system 10 includes memory 12 which stores instructions 14 for performing the method described in greater detail with reference to FIG. 2 and a processing device (or "processor") 16 in communication with the memory for executing the instructions 14.

The system receives as input a social media post 18 which includes text content 20 and associated information 22, e.g., in the form of metadata. The social media post 18 may be referred to as a microblog since such posts are generally limited to a maximum number of characters in the text content, e.g., 140 characters. The text content 20 generally includes words in a natural language, such as English or French (or a combination of languages, when code shifting is used), although the displayed content of the post may also include graphical emoticons, images, and the like. It can be assumed that the post 18 was originally posted on a microblogging service, such as Twitter, that allows registered users of the service to broadcast short posts 18 often called tweets. A set of such posts 18 may have been collected by a company or other entity desiring to analyze the posts to extract information, such as opinions on products and/or services of the entity. In order to extract such information from the text content 20, it is advantageous to predict the natural language, or the predominant language(s) in which the text content 20 is written.

The associated information 22 may include, for example, geographic location, a time-stamp, and a social network of the author. For example, each tweet although limited to a maximum number of 140 characters, also contains 150 metadata points, including a unique numerical ID for the tweet and IDs for all the replies, favorites and retweets that it gets. It also includes a timestamp, a location stamp, the language, the date the account was created, the URL of the author, if a website is referenced, the number of followers, and so forth, although some of these sources of are redundant. In the exemplary embodiment at least some of the information associated with the tweets an author has read (i.e., received) in the past (received tweets) is used to bias the probability that he will author a tweet in a certain language. For example, the number of tweets in different languages "read" by the author in the past can be employed as features input to a statistical classifier (e.g., using early fusion), or used separately to predict language and then combined with content-based predictions in a late fusion approach.

The system 10 outputs language-based information 24 for the post 18, such as a predicted language, or information based thereon.

The system 10 may be hosted by one or more computer devices, such as the illustrated server computer 26. The server computer may communicate with external devices, such as one or more client devices 28, via a link 30, such as a wired and/or wireless network, e.g., the Internet.

The system 10 includes one or more input/output devices 32, 34 for communication with external devices, such as the client computing device. Hardware components 12, 16, 32, 34 of the system are communicatively connected by a data/control bus 36.

The exemplary hybrid system and method for language identification predicts a language for the post 18 as a function of a background model 40 and a graph model 42. The background model is based on the content (text content 20 and/or metadata 22) of only the tweet 18 itself, while the graph model 42 takes social context (other tweets and users) into account. These models are combined to identify the language for a given tweet 18. For example, a language lang(t) is predicted for the tweet t as the one which gives the maximum value, over all languages considered, of an aggregate (e.g., weighted sum) of a background prediction $p(l|t, \theta_{background})$, for the language l considered, output by the background model 40, and a graph prediction $p(l|t, \theta_{graph})$ output by the graph model 42, as shown, for example, in Equation 1:

$$\text{lang}(t) = \text{argmax}_l (\lambda_1 p(l|t, \theta_{background}) + \lambda_2 p(l|t, \theta_{graph})) \quad (1)$$

where $\theta_{background}$ are the parameters of the background model 40, such as the learned fingerprint (e.g., n-gram probabilities) for each considered language;

$\theta_{graph}$ are the parameters of the graph model 42, extracted from a social network graph 44, which includes nodes whose labels are learned, in the exemplary embodiment, through label propagation, and $\lambda_1$ and $\lambda_2$ are weights for the respective background and graph models 40, 42.

The illustrated instructions 14 include a background feature extraction component 50, a background prediction component 52, a graph generation component 54, a graph prediction component 56, an aggregation component 58, an information output component 60, and optionally a learning component 62. The background feature extraction component 50 extracts background features from the text content and/or meta data of the post 18. The background prediction component 52 computes first (background-based) language label predictions (scores) for the tweet, for each of a set of languages. These predictions are based on the extracted background features and the parameters of the background model 40. The graph generation component 54 generates a graph 44 for predicting the language of the post 18. The graph may be based on information extracted from a collection 64 of tweets received by an author of the tweet 18, e.g., in his or her newsfeed. The graph prediction component 56 computes second (graph-based) language label predictions (scores) for the unlabeled tweet 18, one for each of the set of languages, based on the graph 44. The aggregation component 58 generates an overall score for each of (or at least some of) the languages in the set. The overall score is generated as a function of the background score and the graph score. The aggregation component 58 identifies the language(s) giving the highest score(s). The output component 60 outputs information based on the identified language(s). The learning component 62 learns the background model 40, e.g., a set of content-based classifiers, for predicting the background scores. The classifier learning may be performed in a supervised manner using a set 66 of posts, each manually labeled with a respective language. Once the parameters of the classifiers are learned, the learning component 62 can be omitted from the system.

The scoring of the languages incorporates the social network of the author to improve language identification of social media posts 18. The system and method assume that, for example, a user well-connected to users posting in Catalan has a higher probability of posting in that language. In an exemplary embodiment, the language prediction scores of a content-based classifier 40 are combined with those of a method that models the social network as a graph 44. Since the languages of other authors in the network are not always known, label propagation (LP), a graph-based semi-supervised approach is employed, which propagates labels from a few labeled instances across the graph 44 to previously unlabeled instances. The results show a useful improvement over existing methods.

The computer system 10 may include one or more computing devices 26, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data 40, 42, 44.

The network interface 32, 34 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 26.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
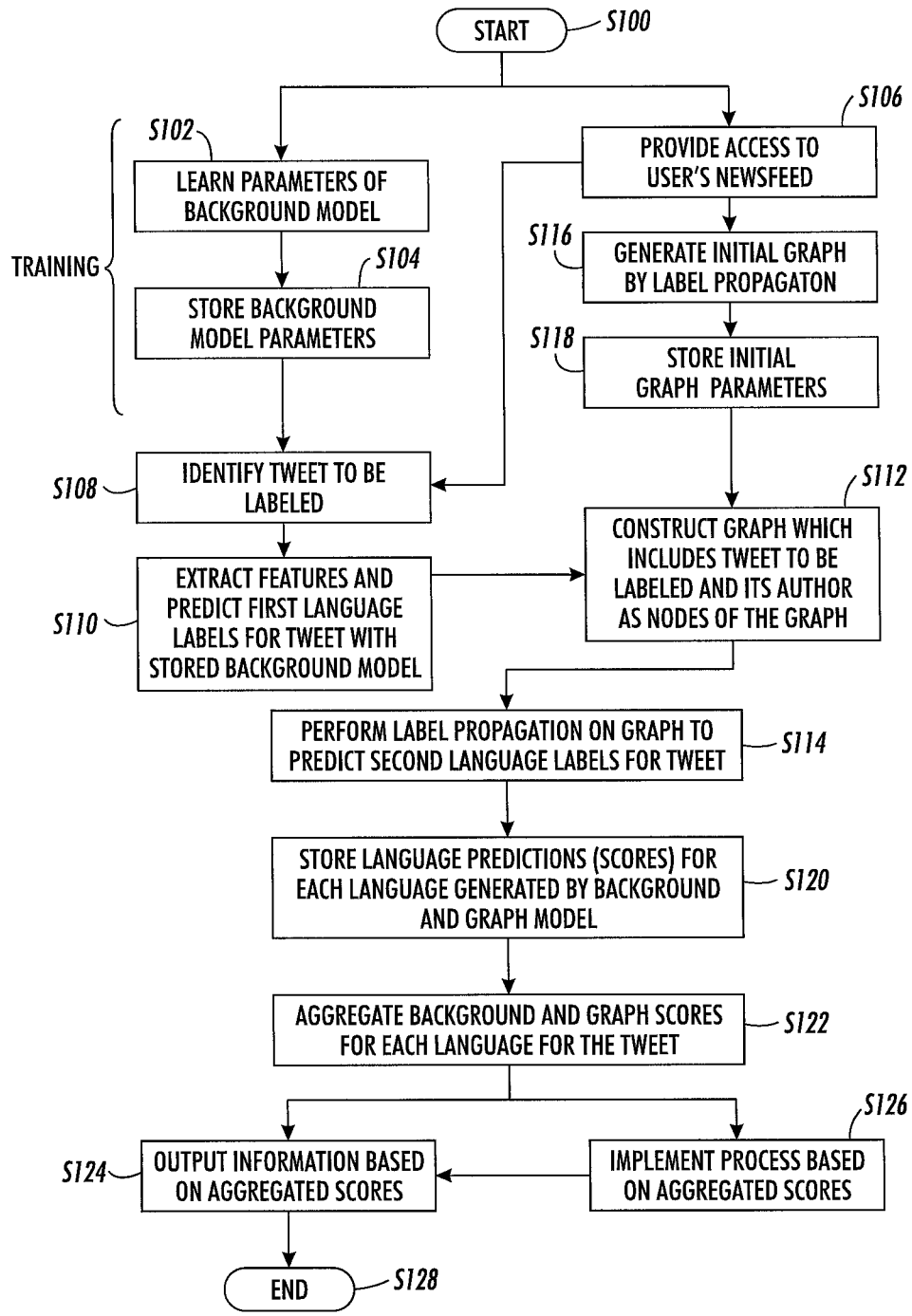
FIG. 2 is a flow chart of a method for language identification in accordance with another aspect of the exemplary embodiment.

With reference now to FIG. 2, a method for identifying the language of a tweet 18 posted by an author, which can be performed with the system of FIG. 1, is shown. The method begins at S100.

At S102, optionally, parameters of a background model 40 (e.g., a classification model for each considered language) are learned using the learning component 62.

At S104, the background model parameters are stored.

At S106, access is provided to a set 64 of tweets in the author's newsfeed.

At S108, a tweet 18 by the author, whose language is to be predicted, is identified, and may be temporarily stored in memory.

At S110, background model predictions are made. In particular, background features are extracted from the tweet 18 by the background feature extraction component 52. Background predictions of the tweet's language(s) are then computed by the background prediction component 52, based on the extracted background features, using the trained background model 40.

At S112, a social network graph 44 is constructed, by the component 54. The graph includes the tweet 18 and its author as nodes of the graph, as well as nodes for other users and their tweets. Weights are assigned to edges of the graph which connect the nodes.

At S114, label propagation is performed on the graph 44, by the component 56, e.g., using the MAD algorithm. At each iteration of the algorithm, language labels are propagated to neighboring unlabeled nodes in proportion to the weight of the respective edge connecting the nodes.

In one embodiment, S114 is preceded by a training phase S116, in which labels for unlabeled nodes of an initial graph 68 (similar to the social network graph 44, but without the tweet 18), are predicted by label propagation (i.e., in the same way as for step S114), and the node label predictions are stored (S118). The unlabeled tweet 18 is then added to the initial graph to generate the social network graph 44 (S112) and the algorithm is rerun (S114).

At S120, the predicted label(s) (scores) for the tweet 18, generated by the graph model 42 (i.e., by label propagation on graph 44) and the background model 40, are stored. This can be, in each case, the language with the highest score or scores for some or all of the languages.

At S122, the background scores and graph scores for each language for the tweet are aggregated, for example using Eqn. 1. The language which has the highest score is identified.

At S124, information is output based on the aggregation, such as the most probable language for the post 18 or predictions for some or all of the languages.

In some embodiments, at S126, a process may be implemented based on the predicted language of the social media post 18, for example, the text of the tweet may be mined for opinions or other information may be extracted, e.g., using parsing techniques developed for the identified language(s).

The method ends at S128.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 26, (for example, an internal hard drive of RAM), or may be separate (for example, an external hard drive operatively connected with the computer 26), or may be separate and accessed via a digital data network such as a local area network (LAN) or the Internet (for example, as a redundant array of inexpensive of independent disks (RAID) or other network server storage that is indirectly accessed by the computer 26, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the labeling method. As will be appreciated, while the steps of the method may all be computer implemented, in some embodiments one or more of the steps may be at least partially performed manually. As will be appreciated, the steps of the method need not proceed in the order illustrated and fewer, more or different steps may be included.

Further details of the system and method will now be provided.

1. Background Model

For generating the background model 40 (S102), the content of the tweets in the set 66 of manually-labeled posts can be used, by the learning component 62, to learn a multi-class classifier or a classifier for each considered language.

Any suitable learning method can be used for learning the background model classifier(s), such as logistic regression, linear regression, support vector machines (SVMs), with various choices of kernel, compression-based classifiers (see, e.g., Bergsma 2012 and Brian O. Bush, "Language identification of tweets using LZW compression," Pacific Northwest Regional NLP Workshop (2014)), or the like. For example, for each of the set of languages, a one-vs.-all $l_2$ regularized logistic regression (i.e., maximum entropy) classifier is learned.

The classifier(s) are learned with n-gram features extracted from the text 20 of the posts in the set 66. An n-gram is a sequence of n symbols where the symbols can be, for example, words or characters and n can be, for example, at least 2, such as up to 10, or up to 5 symbols. In one embodiment, the n-grams are character 2- to 5-grams not spanning over word boundaries (i.e., each n-gram is extracted from only a single word). Character n-grams tend to be more suitable than word n-grams due to the short length of the text of a post and also because words are often abbreviated. As an example, for each language, a fingerprint is generated which includes the most salient character n-grams extracted from a source in that language, as described, for example, in U.S. Pat. No. 6,167,369, incorporated herein by reference. The source can be, for example, Wikipedia. In English, salient 3-gram character n-grams may include sequences of characters such as the, she, wha, and the like, which are commonly used in English, but are less common in other languages. The fingerprint may include a large number of character n-grams such that for a given tweet in the selected language, there is a likelihood that at least some of the n-grams are found in the text content. Experiments may be performed to identify a suitable set of n-grams for giving good language prediction performance.

A feature-based representation of a tweet 18 can then be generated, in which each feature is based on the number of occurrences, or simply the presence/absence, of a respective one of the n-grams appearing in the tweet. In a simplified example, suppose the fingerprint includes the (limited) set of n-grams day, her, him, old, ord, the, cold, free, here, rece, what, today. Then, given a tweet with the content:

Record cold here today! #2015freeze, the representation (1,1,0,1,1,0,1,1,1,0,0,1) can be generated, where each element indicates the presence (1) or absence (0) of the respective n-gram in the list. Of course, in practice, the representations contain many more features and tend to be very sparse.

For each language, a classifier model 40 is learned on the feature representations and the language labels (e.g., 1 for the language 1 under consideration and 0 for "other" languages) of the tweets in the set 66. This can be implemented, for example, using liblinear wrapped using C and Cython, implemented by scikit-learn (see http://scikit-learn.org/stable/mod ules/svm.html#svm).

Then, given a tweet 18 to be scored with the trained classifiers, a representation is extracted and a score computed for each language using the respective trained background classifier. The final scores for each tweet can then be normalized over all classes in order to obtain a probability distribution.

As will be appreciated, some of the first (background) label predictions may be 0, or close to 0. In some embodiments only those language labels which have at least a threshold score are retained (and/or only the language labels with the top k scores are retained), and the rest of the languages are ignored.

Other methods for assigning background model scores are described, for example in U.S. Pat. No. 6,167,369, incorporated by reference.

2 Graph-Based Model

In the exemplary method, the social network graph 44 is used to model the social media context, relating tweets to one another, authors to tweets and to other authors. Edges are created between nodes.

Figure 3:
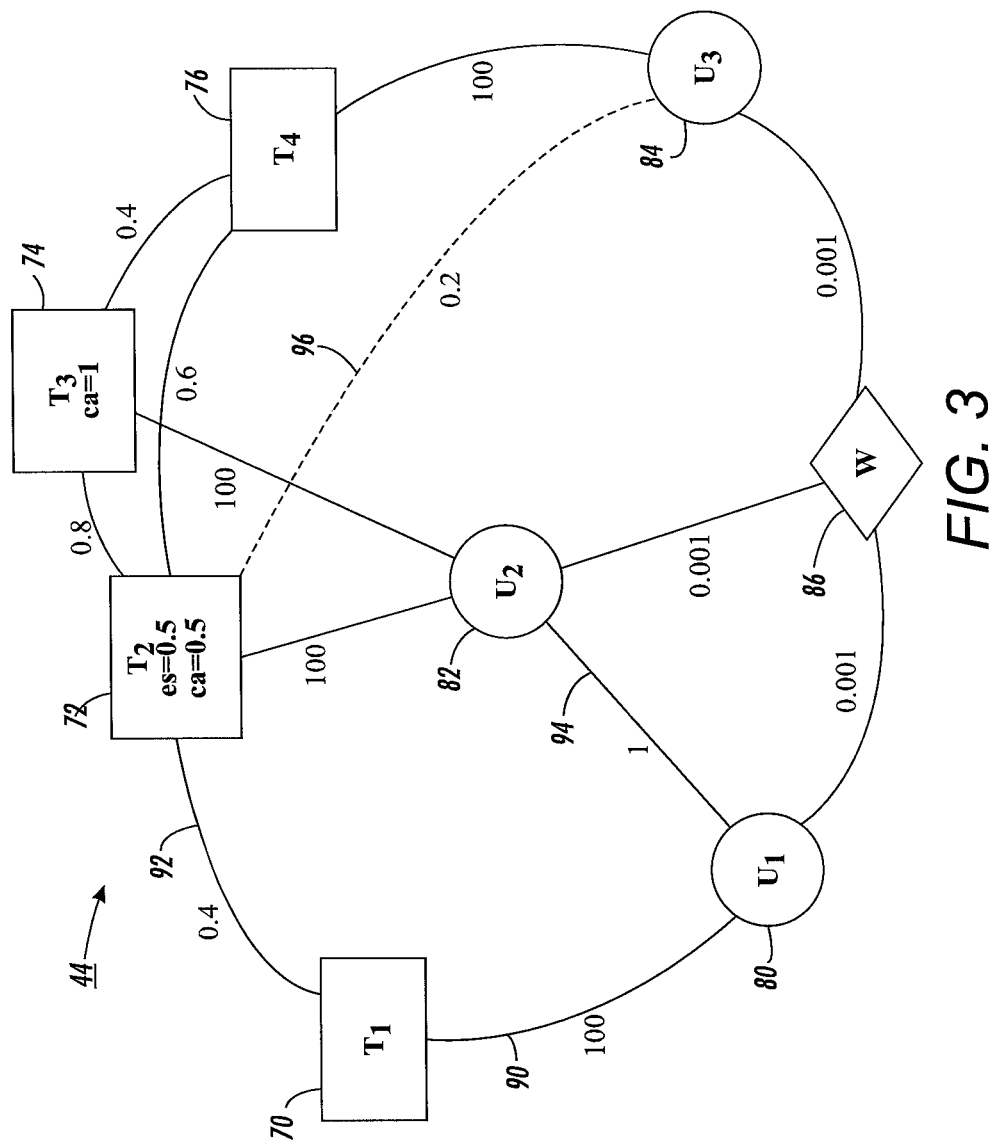
FIG. 3 illustrates a graph which includes social network post nodes and user nodes for predicting labels of unlabeled social network posts through label propagation.

As illustrated in the small example graph shown in FIG. 3, for example, for generating the graph-based model 42, the collection 64 of received posts is used to generate an undirected graph 44. Each tweet 18 in the collection identifies its author, e.g., in the text content 20 and/or in its metadata 22. The graph initially includes a set of nodes including social media post nodes, or "tweet nodes" (T1, T2, T3, T4, etc.) 70, 72, 74, 76, etc., each representing only a single tweet. The graph also includes user (e.g., author) nodes (U1, U2, U3, etc.) 80, 82, 84, etc., each author node representing only a single author. One of the tweet nodes 70 corresponds to the tweet 18 to be labeled. One of the author nodes 80 corresponds to the author U1 of that tweet. Other user node(s) 82, 84 may correspond to authors U2, U3 of the tweets 72, 74, 76 in the newsfeed. A world node (W) 86 maintains the connectivity of the graph, in one embodiment. The nodes are connected by edges 90, 92, 94, etc., which are each associated with a respective weight.

Initially, some of the text nodes 72, 74 are labeled with an initial distribution over language labels (e.g., Spanish (es), Catalan (ca)), while others 70, 76 are unlabeled. In one embodiment, at least some of the labeled tweets may have been manually labeled. In another embodiment, for at least some of the labeled tweets, the author of the tweet may have designated a language, which is retrieved from the metadata of the tweet. In another embodiment, at least some of the labeled tweets may have been previously labeled in generating a prior graph 68. In another embodiment, background prediction may be used as the labels for a subset of the tweets if the prediction has a very high confidence. The threshold on the confidence may be set such that only a small proportion, such as less than 20% or less than 10% of the unlabeled nodes are likely to assigned labels in this way. The majority of the unlabeled nodes are thus assigned labels based on label propagation (S114) as well as by the background method. A combination of labeling methods may be employed for generating the initial labels.

Label propagation (S114) is used to propagate labels throughout the graph as a function of the weights of the edges. Label propagation approaches have proved to be useful techniques for semi-supervised problems where the domain can naturally be described using an undirected graph, as is the case here. See, e.g., Xiaojin Zhu, et al., "Learning from labeled and unlabeled data with label propagation," Technical report, CMU-CALD-02-107, Carnegie Mellon University, pp. 1-17 (2002). Rather than propagating one probability mass around the graph (which is then used to produce a rank), the nodes of the graph 44 carry a distribution over multiple labels. At each iteration, a node updates its distribution using a combination of each of its neighbors' distributions in proportion to the weight of the edge between it and the neighbor. When the algorithm converges, previously unlabeled nodes have a label distribution. Modified Adsorption (MAD), is a modification of the standard label propagation method that allows more control of the random walk through the graph, for example by disfavoring propagating label mass through high-degree nodes (nodes which have a large number of edges). This approach is described, for example, in Talukdar, et al., "New Regularized Algorithms for Transductive Learning," Proc. European Conf. on Machine Learning and Knowledge Discovery in Databases: Part II in ECML PKDD '09, pp. 442-457 (2009), hereinafter, "Talukdar 2009". Applications of the LP and MAD approaches are also described in Baluja 2008, Speriosu, et al., "Twitter Polarity Classification with Label Propagation over Lexical Links and the Follower Graph," Proc. 1st Workshop on Unsupervised Learning in NLP, pp. 53-63 (2011), Chen, et al., "Semi-supervised Relation Extraction with Label Propagation," Proc. Human Lang. Technol. Conf. of the NAACL, Companion Volume: Short Papers, pp. 25-28 (2006), and Talukdar, et al., "Experiments in Graph-Based Semi-Supervised Learning Methods for Class-Instance Acquisition," Proc. 48th Annual Meeting of the Ass'n for Computational Linguistics, pp. 1473-1481 (2010). The ability to propagate or smooth labels over a graph has proven useful in cases where supervised data is limited.

MAD has been used for time-limited part-of-speech annotation, iteratively annotating tokens or sentences, and then propagating labels to unlabeled instances. Dan Garrette, et al., "Learning a Part-of-Speech Tagger from Two Hours of Annotation," Proc. 2013 Conf. of the North American Chapter of the Ass'n for Computational Linguistics: Human Language Technologies, pp. 138-147 (2013).

The edges are accorded different weights, based on the type of nodes they connect. For example, the edges are accorded weights as follows:

T-T edges (edges connecting two tweets) are weighted based on their content similarity, e.g., weighted with the cosine similarity between word unigrams of the tweets. The T-T edges thus have values of greater than 0 and less than 1 (unless the tweets are identical). Other similarity measures can alternatively be employed, such as similarity based on character n-grams (e.g., extracted as for the background model).

T-U edges, between a tweet and its author, are all given a maximum weight, e.g., 100.

U-U edges between two users who are in a "follows" relationship are all accorded a same, intermediate weight (less than T-U, but greater than U-W and T-T), such as 1. The edges are non-directional, so in this case, either (or both) of the two users connected by the edge can be a "follower." The information on who-follows-who can be retrieved from Twitter's API, for example.

U-W edges between a user node and the world node are all given a same, low weight (less than T-U and U-U and generally less than T-T), e.g., 0.001 to ensure that the graph is connected.

As will be appreciated, the weights for the edges T-U, U-U, and U-W can be optimized using a labeled training set and thus can be different from the example weights. More broadly, edges of the graph are weighted differently for at least two of these types.

The graph is built using as much available data as possible and, where available, nodes contain a distribution over language labels. In some embodiments, tweets drawn from the training dataset 66 can be included in the graph, labeled with their manually applied labels, using a uniform distribution over labels where a tweet was labeled with more than one language. One approach to building the tweet-tweet component of the graph entails $O(n^2)$ comparisons to measure the similarity of each tweet with all others. To reduce the amount of computation, k-nearest-neighbor classification on the whole set of tweets, each represented as a bag-of-word unigrams can be performed, and then similarity comparisons between each tweet and only the top-k neighbors is computed, e.g., using the cosine similarity or other similarity measure. k may be, for example, about 25% of the total number of tweets so as to capture as many real links as possible, while avoiding exhaustive comparison.

Twitter uses an asymmetric "friendship" relationship, distinguishing Friends ("accounts I am following") and Followers (accounts that are following me). In the exemplary embodiment, Followers and Friends are considered as being in a "follows" relationship, although this may introduce some errors as the Followers may speak additional languages. In another embodiment, only the languages of the tweets authored by Friends of a given author are considered when generating the graph.

It may also be beneficial to include specific weights for edges to registered users that are mentioned in a tweet in the graph. For example, in the graph illustrated in FIG. 3, if tweet T2 mentions a user U3 in the text, a "mentions" edge 96, shown by a dashed line, with a mentions weight (e.g., 0.2) may be created between T2 and U3.

The label propagation (S114), e.g., using the MAD algorithm of Talukdar 2009, propagates labels from labeled nodes to unlabeled nodes in an iterative fashion. Both unlabeled user nodes and unlabeled tweet nodes receive labels in the label propagation stage, although the user node labels are not used subsequently. The algorithm treats all unlabeled nodes the same for purposes of generating the second label predictions. At each iteration, a full pass is made over the entire graph 44, e.g., starting with a randomly selected node, and passing sequentially from node to node via the edges connecting them until all nodes have been seen. For each initially unlabeled node 70, 76, 80, 82, 84, 86 that is traversed in the graph, its labels are computed based on the labels of the nodes to which it is directly connected by a single edge, and the weights of the edges.

In the exemplary embodiment, each node has two attributes: label_distribution and temp_label_distribution. At each iteration the method may proceed as follows:

a. visit each node: update temp_label_distribution to be the edge-weighted combination of the label_distributions of the node's neighbors.
b. visit each node: set label_distribution of the node to the value of temp_label_distribution, and clear temp_label_distribution.

For example, in a first iteration, the first node selected may be T2. Since it is an initially labeled node, its language predictions are never updated. Suppose the pass through the graph then proceeds to node T1. Unlabeled node T1 may receive a temp_label_distribution which includes a probability for labels es and ca derived from the label_distribution of labeled node T2 in proportion to the similarity-derived weight 0.4 of the edge 92 connecting them, i.e., es=0.5×0.4=0.2 and ca=0.5×0.4=0.2. The probabilities may then be normalized so that they sum to 1, i.e., giving a temp_label_distribution of es=0.5 and ca=0.5 in this case, which then becomes T1's label_distribution at the end of the first pass. In this iteration, the only other node to which T1 is connected (node U1) is unlabeled and thus T1's labels are unaffected by node U2 in this iteration. Suppose that the first pass then proceeds to node U1. It receives no predictions in the first pass, since the surrounding nodes T1, U2 and W have no label_distributions yet. Suppose that a subsequent iteration proceeds from U1 to T1. The updated label_distribution predictions for U1 are then used to update the predictions for T1 in proportion to the weight of the edge 90 as well as the prediction derived from T2 via edge 92.

For each initially unlabeled node, only the labels of the immediate neighbors are considered in updating the node's labels. Upon convergence, the label distribution of previously unlabeled nodes is identified to find the value of $\theta_{graph}$ for the post 18, i.e., its label distribution $p(l|t, \theta_{graph})$ over one or more of the languages. The distribution over each label can be normalized in order to obtain a probability distribution. In some embodiments, at the end of the iterations, a node may be labeled with scores for only those languages that are above a threshold probability.

In the exemplary method, only a few iterations of the algorithm are needed for convergence to be achieved (i.e., little or no change to the label distributions of the unlabeled nodes). For example, from 1-5 iterations may be used.

As will be appreciated, the graph 44 shown in FIG. 3 is a simplified graph and in practice may include many more nodes, such as at least 20, or at least 50, or at least 100, or at least 1000 nodes. Additionally, the graph can be used to predict label scores for a number of unlabeled tweets of the same author (and/or of different authors). Moreover, while FIG. 3 only includes initial labels for some tweets, it is also contemplated that one or more of the other user nodes may be initially labeled in the same way.

In one embodiment, once an initial graph 68 has been generated e.g., at S116, and one or more iterations have been performed, one or more additional nodes may be added to the graph at S112, such as one or more labeled/unlabeled tweet nodes 18 and/or one or more labeled/unlabeled user nodes. Then, at S114, the LP algorithm can be run for one or more iterations to generate label probabilities $p(l|t, \theta_{graph})$ for the additional unlabeled nodes(s). In this embodiment, in the training stage S116, the LP algorithm is used to generate labels for a set of unlabeled nodes, which need not include the tweet 18 to be labeled. Then in the labeling stage S114, the algorithm may be run for one or more iterations to provide label probabilities for the unlabeled tweet. In this embodiment, the labels given to unlabeled nodes in the training stage S116 may be fixed at the end of the training stage, i.e., they are treated as labeled nodes for the labeling stage S114.

As will be appreciated, some of the second (graph) label predictions may be 0, or close to 0. In some embodiments after label propagation, only those language labels which have at least a threshold score are retained (and/or only the language labels with the top k scores are retained), and the rest are ignored.

Aggregating Scores

The scores from the background and graph models may be aggregated, e.g., summed, with Eqn. 1. In one embodiment, only one language is reported per tweet, i.e. corresponding to the language with the highest aggregated score. Since both background and graph models give a score which is not a probability distribution, these can be used in a multi-label setting. Predicting multiple labels for a tweet can give increased performance for some applications.

The exemplary hybrid method for language identification uses both a background model 40 and a graph model 42 that takes social context into account. Thus in the exemplary embodiment, both $\lambda_1$ and $\lambda_2$ in Eqn 1 are non-zero. While in some embodiments, $\lambda_1 = \lambda_2$, in other embodiments suitable values of $\lambda_1$ and $\lambda_2$ which are not equal are employed. In one embodiment, $\lambda_1$ and $\lambda_2$ are learned on a development set, similar to collection 64. In another embodiment, an adaptive weighting of the $\lambda$ parameters is performed, based on the connectivity of the given tweet 18, and/or the predicted language(s). For example, a user who has recently joined the social network may not have many followers. In such cases, the background model may be given a higher weight $\lambda_1$ than for a user who has many followers, and thus is highly connected in the social graph 44. In some embodiments, if the graph is very sparse, the background model may be given a higher weight $\lambda_1$ than the graph model, or in some cases, $\lambda_2$ may be set to 0.

While the exemplary method is described in terms of aggregating content-based and social network-based scores, in other embodiments, the content-based score is not used, i.e., equivalent to $\lambda_1 = 0$ in Eqn. 1.

In some embodiments, other features of the post 18 are used in predicting its language, which may be derived, for example, from the metadata of the post, e.g., geolocation, as well as information embedded in the content, such as Uniform Resource Locators (URLs). These features may be included in the background model prediction.

As an example of one application of the method, suppose that there are five languages in the set, denoted A-E. Suppose that the background model predicts language A=0.3, language B=0.5 and language C=0.2, and all other languages at 0, and the graph model predicts language A=0.2, language B=0.3 language C=0.4, and language D=0.1, with all other languages 0. Then if $\lambda_1 = 0.4$ and $\lambda_2 = 0.6$, the aggregated scores are:

$A = 0.3 \times 0.4 + 0.2 \times 0.6 = 0.24$ $B = 0.5 \times 0.4 + 0.3 \times 0.6 = 0.38$ $C = 0.2 \times 0.4 + 0.4 \times 0.6 = 0.32$ $D = 0.0 \times 0.4 + 0.1 \times 0.6 = 0.06$ The information output by the system may be the language with the highest score (language B), the aggregated score for each of the top k languages, where k is at least 1 or at least 2, a rank for each of at least some of the languages (e.g., 1-B, 2-C, 3-A, 4-D, 5-E), or a combination thereof.

In some embodiments, the predicted language may be used to extract information from the tweet (S126), e.g., by sending the tweet to the right language processing system. The language processing system may include a parser for the identified language. The processing system may be adapted for entity recognition (see, e.g., U.S. Pub. No. 2014/0163951, published Jun. 12, 2014, entitled HYBRID ADAPTATION OF NAMED ENTITY RECOGNITION, by Vassilina Nikoulina, et al.), processing hashtags (e.g., using the method of application Ser. No. 14/064,327, filed Oct. 28, 2013, entitled CLASSIFICATION OF HASHTAGS IN MICRO-BLOGS, by Caroline Brun, et al.), opinion mining (see, e.g., U.S. Pub. No. 20140365207, published Dec. 11, 2014, entitled METHOD AND SYSTEM FOR CLASSIFYING REVIEWERS' COMMENTS AND RECOMMENDING RELATED ACTIONS IN IDEA-GENERATING SOCIAL MEDIA PLATFORMS, by Gregorio Convertino, et al.), providing recommendations (see, e.g., U.S. Pub. No. 20130218914, published Aug. 22, 2013, entitled SYSTEM AND METHOD FOR PROVIDING RECOMMENDATIONS BASED ON INFORMATION EXTRACTED FROM REVIEWERS' COMMENTS, by Anna Stavrianou, et al.), suggestion mining (see, e.g., U.S. Pat. No. 8,738,363, issued May 27, 2014, entitled SYSTEM AND METHOD FOR SUGGESTION MINING, by Caroline Brun, et al.), machine translation, and the like. The disclosures of each of these references are incorporated by reference.

Without intending to limit the scope of the exemplary embodiment, the following examples illustrate application of the method in language identification for tweets.

EXAMPLES

A collection of tweets in different languages tweeted in the Iberian Peninsula was used for evaluation of the method (see http://komunitatea.elhuyar.org/tweetlid). The collection includes a training corpus and a test corpus.

TABLE 1 shows the language distribution in these corpora.

TABLE 1

Data distribution

| Language | Training Set | Test Set |
| --- | --- | --- |
| Spanish (es) | 8,437 | 11,975 |
| Portugese (pt) | 2,102 | 1,957 |
| Catalan (ca) | 1,555 | 1,600 |
| English (en) | 1,127 | 1,069 |
| Galician (gl) | 748 | 607 |
| Basque (eu) | 508 | 452 |
| Undetermined (und) | 192 | 911 |

Tweets may be annotated with more than one language, for example, if the tweet uses code switching or if the reviewer is unsure which language the tweet is written in. To compensate for the bias of more popular languages (about 60% of the tweets are in Spanish) an evaluation script provided by the organizers of the corpus is employed. This computes a macro-average and takes into account partial hits for tweets composed in multiple languages.

For the evaluation, the tweets were pre-processed to remove urls.

The method described above was followed, using Eqn. 1, where $\lambda_1=1$, $\lambda_2=0$ for a Background (baseline) method, and $\lambda_1=\lambda_2$ for a Background+Graph method. 2-5 character n-grams not spanning words were used to generate the classifiers using the labeled training set. The trained classifiers were then used to compute the background probability for the tweets in the test set based on their respective 2-5 character n-gram representations. For the graph probability, T-T edges are weighted based on their content similarity between word unigrams of the tweets; T-U edges are all given a weight of 100; U-U edges have a weight of 1; U-W edges have a weight of 0.001. The graph model was trained on both the training set and the test set.

In both cases, a logistic regression (max entropy) model ($l_2$ regularized) as implemented by the liblinear library (and called through python's scikit package) was used. For the background model scores, each trained classifier (one per language) was run and the node received the assigned label as long as the label prediction was over a threshold value of 0.5.

TABLE 2 shows the results obtained. Ambiguous (amb) tweets are tweets that could have been written in any of a set of languages: any of the response is deemed correct by the evaluation script. Undetermined language (und) tweets are either other languages, or languages which could not be determined. These can be treated as an additional class.

TABLE 2

Results for language identification using Background only and Background + Graph

| | Background | | | Background + Graph | | |
| --- | --- | --- | --- | --- | --- | --- |
| | P | R | F | P | R | F |
| es | 92.64 | 95.69 | 94.14 | 93.55 | 95.89 | 94.70 |
| pt | 89.81 | 92.58 | 91.17 | 94.87 | 92.52 | 93.68 |
| ca | 81.14 | 87.19 | 84.06 | 85.22 | 90.17 | 87.62 |
| en | 77.42 | 76.18 | 76.79 | 77.86 | 70.53 | 74.01 |
| gl | 56.93 | 52.93 | 54.85 | 65.15 | 50.35 | 56.80 |
| eu | 92.41 | 76.29 | 83.58 | 94.41 | 68.01 | 79.06 |
| amb | 100.00 | 89.56 | 94.49 | 100.00 | 85.54 | 92.21 |
| und | 66.67 | 10.98 | 18.85 | 45.06 | 28.54 | 34.95 |
| Average | 82.13 | 72.67 | 74.74 | 82.01 | 72.69 | 76.63 |

The results in TABLE 2 suggest that using the background model alone can be more effective for languages that are very distinct in the set of languages (e.g., English and Basque). For languages that are more closely related, adding the social graph helps tease apart minority languages with respect to similar majority ones (Catalan-Spanish, and Galician-Portuguese). It is in these minority languages that the gain of including the social context is highest.

Overall, the method yields an improvement over the twelve methods evaluated on the same data for the tweetLID competition (Twitter Language Identification Workshop at SEPLN 2014). See http://komunitatea.elhuyarorg/tweetlid/participation/#Results. Another advantage of the LP step is that users are also assigned a language distribution, which may be of independent interest.

The results show that including the social network of users when determining the language of their posts achieves an increase in $F_1$ measure, with a higher impact on lower-resource languages (Catalan and Galician) which are hard to distinguish from more popular similar languages (Spanish and Portuguese).

As will be appreciated, the results were obtained with fairly basic settings and improvements could be achieved by learning suitable values of $\lambda_1$ and $\lambda_2$, for example.

In this example, only those Followers who have annotated tweets in the training set are considered. In a practical example, these can be predicted: while this may introduce errors it enlarges considerably the support to compute the histograms.

As an additional simplification, only an early-fusion approach where for each language the sum of all tweets read in that language was evaluated. Late-fusion approaches (weighted vote) or even including the confidence of each vote may give even larger improvements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for language prediction of a social network post comprising:
   generating a social network graph which includes nodes connected by edges, some of the nodes being user nodes representing users of a social network, at least some of the users being authors of social network posts, and some of the nodes being social network post nodes representing social network posts of the authors, at least one of the social network post nodes being unlabeled, the edges of the graph being associated with respective weights;
   predicting language labels for the at least one unlabeled social network post node, including propagating language labels through the graph using label propagation as a function of the respective weights; and
   predicting a language of the social network post based on the predicted language labels generated for the social network post node representing that social network post,
   wherein at least one of the generating of the social network graph, propagating language labels, and predicting the language of the social network post is performed with a processor.

2. The method of claim 1, wherein the predicting of the language of the social network post is also based on features extracted from text content of the social media post.

3. The method of claim 2, wherein the features include n-grams extracted from the social network post.

4. The method of claim 3, wherein the n-grams are character n-grams which do not span word boundaries.

5. The method of claim 1, wherein the predicted language lang(t) of the social network post t is a function of:

$$\mathrm{argmax}_l(\lambda_1 p(l|t,\theta_{background}) + \lambda_2 p(l|t,\theta_{graph}))$$

where $\theta_{background}$ are parameters of a background model, $\theta_{graph}$ are the parameters of a graph model, extracted from the social network graph, and $\lambda_1$ and $\lambda_2$ are weights for the respective background and graph models.

6. The method of claim 1, wherein the edges of the social network graph are weighted differently for at least two of:
   T-T edges that connect social network nodes representing two social network posts;
   T-U edges between a social network node representing a social network post and a user node representing its author; and
   U-U edges between nodes representing two users who are in a follows relationship.

7. The method of claim 6, wherein the edges of the social network graph are weighted differently for each of T-T edges, T-U edges, and U-U edges.

8. The method of claim 6, wherein at least one of:
   the T-T edges of the social network graph are weighted based on their textual content similarity;
   the T-U edges of the social network graph are given a maximum weight; and
   the U-U edges of the graph are given an intermediate weight which is less than for the T-U edges.

9. The method of claim 6, wherein the social network graph includes a world node to provide connectivity between every node of the graph, U-W edges between a user node and the world node being given a low weight which is less than for the T-U and U-U edges.

10. The method of claim 1, wherein the method further includes generating the social network graph based on social media posts in a newsfeed of one of the users represented by a node in the graph, which newsfeed includes the social media post.

11. The method of claim 1, wherein the generating of the social network graph includes:
   generating an initial graph which includes nodes representing users and nodes representing social network posts, the nodes being connected by edges, wherein the initial graph does not include the social media post;
   propagating labels through the initial graph using label propagation to predict language labels for unlabeled nodes of the initial graph; and
   after the propagation, adding a node to the initial graph representing the social network post to social network graph.

12. The method of claim 1, wherein the propagating labels through the graph using label propagation also predicts labels for unlabeled user nodes representing respective users.

13. The method of claim 1, wherein the propagating labels includes, for at least one iteration, considering each initially unlabeled node sequentially in a pass through the graph which follows the edges, and updating label predictions for each considered node based on language labels of neighboring nodes.

14. The method of claim 13, wherein the propagating labels includes at least two iterations.

15. A system comprising memory which stores instructions for performing the method of claim 1, and a processor in communication with the memory for executing the instructions.

16. A computer program product comprising non-transitory memory which stores instructions, which when executed by a computer, perform the method of claim 1.

17. The method of claim 1, further comprising extracting information from the social network post, based on the predicted language, with a processing system adapted for one of entity recognition, processing hashtags, opinion mining, providing recommendations, suggestion mining, and machine translation.

18. A system for language prediction of a social network post comprising:
   memory which stores:
      a graph generation component which generates a social network graph including nodes connected by edges, some of the nodes being user nodes representing users of a social network, at least some of the users being authors of social network posts, and some of the nodes being social network post nodes representing social network posts of the authors, at least one of the social network post nodes being unlabeled, the edges of the graph being associated with respective weights;
      a graph prediction component predicts language labels for the at least one unlabeled social network post node by propagating language labels through the graph as a function of the weights;
      a background feature extraction component which extracts features based on text content of the unlabeled social network post;
      a background prediction component which predicts language labels for the social network post based on the extracted features;

an aggregating component for predicting a language of the social network post as a function of the language labels predicted for the social network post node representing that social network post by the graph prediction component and background prediction component;

the system further comprising, a hardware processor which implements the graph generation component, graph prediction component, background feature extraction component, background prediction component, and aggregating component.

19. The system of claim 18, wherein the background prediction component includes a classifier for each of a set of languages learned on features extracted from labeled social media posts.

20. The system of claim 18, wherein the features include character n-grams.

21. A method for language prediction of a social network post comprising:

generating a social network graph including nodes connected by edges, some of the nodes being user nodes representing users of a social network, at least some of the users being authors of social network posts, and some of the nodes being social network post nodes representing social network posts of the authors, at least one of the social network post nodes being unlabeled, the edges of the graph being associated with respective weights;

extracting features based on text content of the unlabeled social network post;

predicting first language labels from a set of language labels for the unlabeled social network post, based on the extracted features;

predicting second language labels from the set of language labels for the at least one unlabeled social network post node comprising propagating language labels through the graph as a function of the weights;

aggregating the predicted first and second language labels; and outputting a language for the unlabeled social media post based on the aggregation, wherein at least one of the generating a social network graph, extracting features, predicting first and second language labels, aggregating, and outputting is performed with a processor.

* * * * *